US012807155B2

(12) United States Patent
Avedisov et al.

(10) Patent No.: US 12,807,155 B2
(45) Date of Patent: Nov. 24, 2026

(54) MITIGATING OCCLUSIONS WITH SENSOR SHARING/COOPERATIVE PERCEPTION

(71) Applicant: TOYOTA MOTOR ENGINEERING & MANUFACTURING NORTH AMERICA, INC., Plano, TX (US)

(72) Inventors: Sergei S. Avedisov, Redwood City, CA (US); Hongsheng Lu, San Jose, CA (US); Onur Altintas, Sunnyvale, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/766,375

(22) Filed: Jul. 8, 2024

(65) Prior Publication Data

US 2026/0008461 A1 Jan. 8, 2026

(51) Int. Cl.
*B60W 30/18* (2012.01)

(52) U.S. Cl.
CPC ......... *B60W 30/18* (2013.01); *B60W 2556/65* (2020.02)

(58) Field of Classification Search
CPC ... B60W 2554/404; B60W 2554/4041; B60W 2554/4042; B60W 2554/4044; B60W 2554/4045; B60W 2556/65; B60W 30/0956; B60W 40/105; B60W 40/11; B60W 60/001; B60W 60/0027; B60W 60/00276; G07C 5/008; H04W 4/38; H04W 4/46
See application file for complete search history.

(56) References Cited

U.S. PATENT DOCUMENTS 11,138,883 B2 * 10/2021 Koravadi ................ B60R 11/04
12,148,285 B1 * 11/2024 Nguyen ............... G06V 10/803
12,246,720 B2 * 3/2025 Dülgar ................... G08G 1/166
(Continued)

FOREIGN PATENT DOCUMENTS

DE 102024100448 A1 * 7/2024 ............ B60W 50/14
DE 102023117712 A1 * 1/2025 ........ B60W 30/0956
(Continued)

OTHER PUBLICATIONS

ETSI (European Telecommunications Standards Institute), "Intelligent Transport Systems (ITS); Vehicular Communications; Basic Set of Applications; Analysis of the Collective Perception Service (CPS); Release 2," 119 pages (https://www.etsi.org/deliver/etsi_tr/103500_103599/103562/02.01.01_60/tr_103562v020101p.pdf).
"V2X Sensor-Sharing for Cooperative and Automated Driving," SAE International, J3224_202208, Aug. 17, 2022, 66 pages (https://doi.org/10.4271/J3224_202208).
(Continued)

*Primary Examiner* — Babar Sarwar
(74) *Attorney, Agent, or Firm* — SHEPPARD, MULLIN, RICHTER & HAMPTON LLP; Daniel N. Yannuzzi

(57) ABSTRACT

Systems and methods are provided for reducing sensor obstructions. A sensor message can be received from a vehicle indicating that the vehicle's sensor view is obstructed. The system can determine that a second vehicle is at least partially obstructing the first vehicle's sensor view. The system can determine a maneuver that reduces or eliminates the obstruction and perform the maneuver.

20 Claims, 8 Drawing Sheets

(56) References Cited

U.S. PATENT DOCUMENTS

| | | | | |
|---|---|---|---|---|
| 2013/0245877 | A1* | 9/2013 | Ferguson | G05D 1/0238 701/23 |
| 2017/0369051 | A1* | 12/2017 | Sakai | B60W 30/18 |
| 2018/0268703 | A1* | 9/2018 | Kang | G08G 1/167 |
| 2018/0290650 | A1* | 10/2018 | Ryne | B60W 30/09 |
| 2019/0293435 | A1* | 9/2019 | Mori | G08G 1/167 |
| 2020/0108869 | A1* | 4/2020 | You | H04W 4/46 |
| 2020/0186290 | A1* | 6/2020 | Zhang | H04L 1/0026 |
| 2021/0109545 | A1* | 4/2021 | Lopez | B60W 10/18 |
| 2021/0155245 | A1* | 5/2021 | Naserian | B60W 40/12 |
| 2021/0323544 | A1* | 10/2021 | Zhao | B60W 30/18145 |
| 2022/0107404 | A1* | 4/2022 | Jin | G01S 13/931 |
| 2022/0116820 | A1* | 4/2022 | Avedisov | G05D 1/028 |
| 2023/0059897 | A1* | 2/2023 | Miucic | H04W 4/44 |
| 2023/0133131 | A1* | 5/2023 | Naserian | B60K 35/10 345/7 |
| 2023/0192117 | A1* | 6/2023 | Avedisov | B60W 30/0956 701/23 |
| 2023/0249707 | A1* | 8/2023 | Yoon | G06V 20/584 340/425.5 |
| 2025/0074398 | A1* | 3/2025 | Teller | B60W 30/08 |
| 2025/0091602 | A1* | 3/2025 | Monteuuis | B60W 60/001 |

FOREIGN PATENT DOCUMENTS

| | | | | |
|---|---|---|---|---|
| GB | 2593915 | A * | 10/2021 | G08G 1/162 |
| WO | WO-2020154599 | A1 * | 7/2020 | G08G 1/096708 |
| WO | WO-2024045558 | A1 * | 3/2024 | B60W 60/001 |

OTHER PUBLICATIONS

"Taxonomy and Definitions for Terms Related to Cooperative Driving Automation for On-road Motor Vehicles," SAE International, J3216_202107, Jul. 16, 2021, 19 pages (https://doi.org/10.4271/J3216_202107).

Piazzoni et al., "CoPEM: Cooperative Perception Error Models for Autonomous Driving," 25th International Conference on Intelligent Transportation Systems (ITSC 2022), Oct. 2022, pp. 3934-3939 (https://doi.org/10.1109/ITSC55140.2022.9921807).

Qu et al., "SEIP: Simulation-based Design and Evaluation of Infrastructure-based Collective Perception," May 29, 2023, arXiv:2305.17892v2 [cs.RO], 8 pages (https://doi.org/10.48550/arXiv.2305.17892).

Yan, "Improving Automated Vehicle Safety with Collective Perception," Master of Science Thesis, Department of Computer Science, University of Alberta, 2022, 65 pages (https://doi.org/10.7939/r3-1bgz-j325).

* cited by examiner

MITIGATING OCCLUSIONS WITH SENSOR SHARING/COOPERATIVE PERCEPTION

TECHNICAL FIELD

The present disclosure relates generally to vehicle sensor views, and in particular, some implementations may relate to sharing sensor views between multiple vehicles to determine occlusions in a vehicle's sensor view.

DESCRIPTION OF RELATED ART

Cooperative perception allows vehicles to exchange information about the objects they have detected, which raises the awareness of the connected vehicles in the presence of pedestrians, unconnected vehicles, cyclists, or any other objects or environmental events. Cooperative perception is accomplished by sharing sensor messages between vehicles. These sensor messages can contain information about the vehicle or infrastructure making the detection, the sensor information, and the information about the detected objects. Other vehicles can use these shared sensor messages not only to inform other connected vehicles of detected objects, but also to determine potential obstructions in a sensor's field of view.

BRIEF SUMMARY OF THE DISCLOSURE

According to various embodiments of the disclosed technology, a method can comprise receiving a sensor message from a first vehicle indicating that the first vehicle's sensor view is obstructed; determining that a second vehicle is at least partially obstructing the first vehicle's sensor view; determining a maneuver for the second vehicle that reduces or eliminates the second vehicle's obstruction of the first vehicle's sensor view; and causing the second vehicle to perform the determined maneuver.

In some embodiments, determining the maneuver for the second vehicle comprises simulating a change in the first vehicle's sensor view based on the maneuver.

In some embodiments, a plurality of vehicles are responsible for the obstructed sensor view, the method further comprising maneuvering one or more of the plurality of vehicles to reduce or eliminate the maneuvered first vehicle's obstruction of the first vehicle's sensor view.

In some embodiments, the method further comprises determining that a maneuver for the first vehicle would reduce the obstruction and maneuvering the first vehicle accordingly.

In some embodiments, determining the maneuver for the second vehicle comprises determining whether the maneuver exceeds a threshold reduction to the obstruction.

In some embodiments, the threshold reduction is based on the first vehicle's ability to sense an object in the second vehicle's sensor view.

In some embodiments, the threshold reduction is based on a distance to which the first vehicle can sense objects.

In some embodiments, the threshold reduction is based on a percentage of the sensor view that is occluded.

In some embodiments, determining the maneuver for the second vehicle comprises determining whether the maneuver is performable by the second vehicle.

In some embodiments, determining whether the maneuver is performable by the second vehicle comprises determining at least one of (i) whether the maneuver is within a performance envelope for the second vehicle; and (ii) whether the maneuver would violate a rule governing operation of the second vehicle.

According to various embodiments of the disclosed technology, a vehicle can comprise one or more processors and a memory coupled to the processor to store instructions, which when executed by the processor, causes at least one of the one or more processors processor to receive a sensor message from a remote vehicle indicating that the remote vehicle's sensor view is obstructed; determine that the vehicle is at least partially obstructing the remote vehicle's sensor view; determine a maneuver for the vehicle that reduces or eliminates the vehicle's obstruction of the remote vehicle's sensor view; and cause the vehicle to perform the determined maneuver.

In some embodiments, determining the maneuver for the vehicle comprises simulating a change in the remote vehicle's sensor view based on the maneuver.

In some embodiments, determining that the maneuver reduces the obstruction to the remote vehicle's sensor view comprises determining that the maneuver exceeds a threshold reduction to the obstruction.

In some embodiments, the threshold reduction is based on the remote vehicle's ability to sense an object in the vehicle's sensor view.

In some embodiments, the threshold reduction is based on a distance the remote vehicle can sense objects.

In some embodiments, the threshold reduction is based on a percentage of the sensor view that is occluded.

According to various embodiments of the disclosed technology, a non-transitory machine-readable medium can have instructions stored therein, which when executed by a processor, causes the processor to receive a sensor message from a first vehicle indicating that the first vehicle's sensor view is obstructed; determine that a plurality of other vehicles are at least partially obstructing the first vehicle's sensor view; simulate a change in the first vehicle's sensor view based on one or more maneuvers of the plurality of other vehicles; determine that the one or more maneuvers reduce or eliminates the obstruction to the first vehicle's sensor view; and cause one or more of the plurality of other vehicles to perform the one or more maneuvers.

In some embodiments, determining that the one or more maneuvers reduce the obstruction to the first vehicle's sensor view comprises determining that each of the one or more maneuvers exceeds a threshold reduction to the obstruction.

In some embodiments, the threshold reduction is based on the first vehicle's ability to sense an object in one of the plurality of other vehicle's sensor view.

In some embodiments, the threshold reduction is based on a percentage of the sensor view that is occluded.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
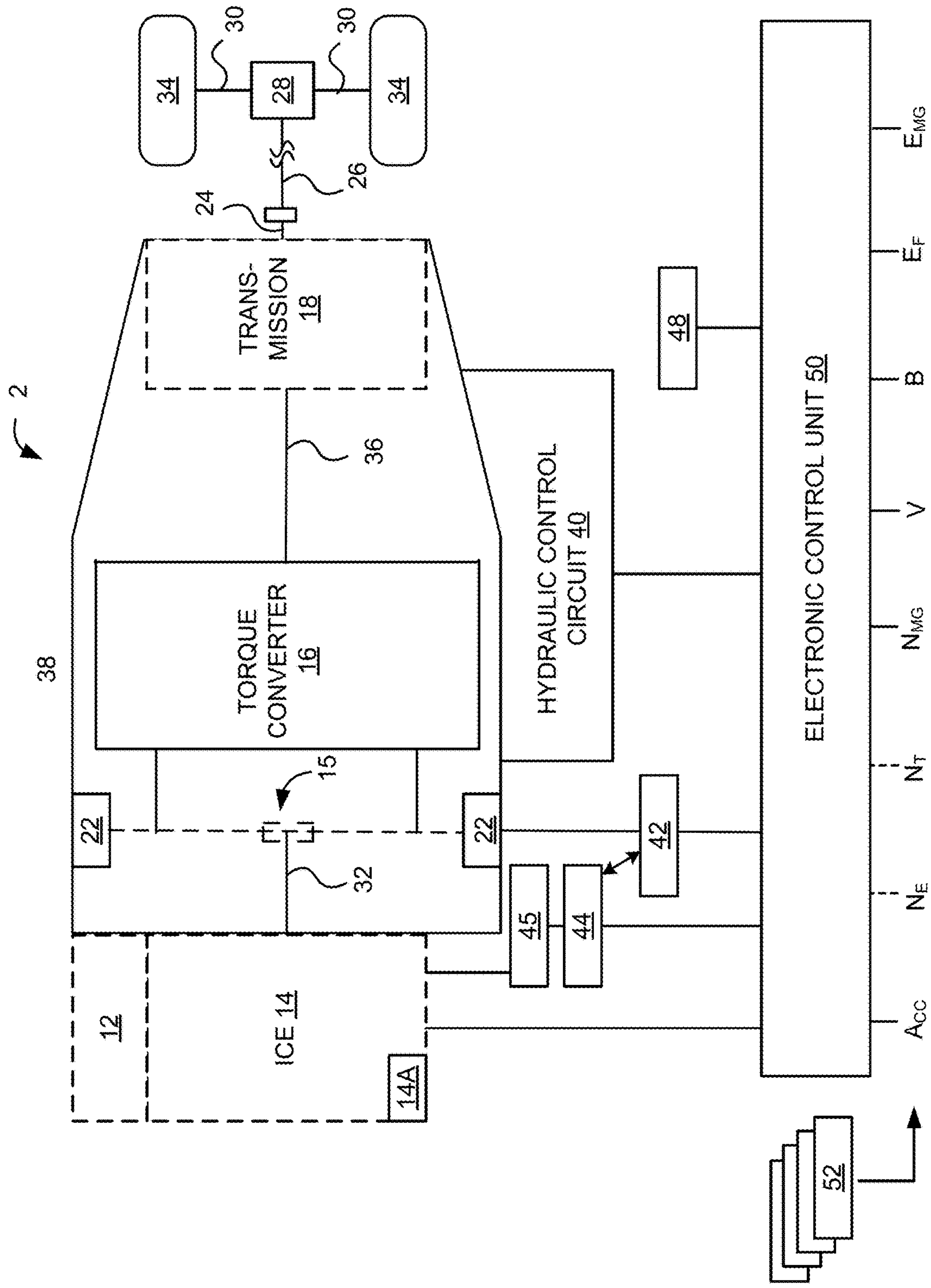
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Vehicles can share sensor messages with other vehicles and receive additional sensor information that a vehicle would not be able to detect on its own. For example, a vehicle may be able to sense objects using proximity sensors up to a threshold distance away from the vehicle. With only its own sensor data, this vehicle would not be able to detect an object outside the threshold distance. However, another vehicle may detect this object using its own proximity sensors (i.e., due to the other vehicle's location relative to the object, the sensors' capabilities, etc.). By sharing this detection with the original vehicle, the original vehicle can improve its effective sensor view and make determinations based on the detected object.

Traditional systems use sensor sharing in this way to add to a vehicle's sensor view by providing additional sensor data that a vehicle would not be able to generate on its own. These systems act accordingly in the presence of an occlusion to a vehicle's sensor view. Here, an occlusion or obstruction can refer to an object or environmental situation that impedes a sensor's field of view or capacity. Traditional systems address occlusions by sharing sensor data related to the occluded area to "complete" the vehicle's sensor view. For instance, if a vehicle cannot detect a hazard due to an object blocking the vehicle's image sensors, other vehicles can share image data from their own sensors relating to the area that would have been sensed had there been no occlusion.

The traditional systems described above can work around an occlusion by providing additional sensor data, but they do not remove or relocate the occlusion. Additionally, vehicles applying traditional systems may have to rely on sensor sharing so long as the occlusion is present, which may not always be an option (i.e., if other vehicles move away or are not available, if sensor sharing capabilities cease temporarily, etc.). Embodiments of the systems and methods disclosed herein can take advantage of sensor sharing to remove occlusions by maneuvering vehicles that are contributing to or are the cause of the occlusion. By removing the occlusion, a vehicle would no longer need to rely on sensor sharing for a complete sensor view.

Some embodiments are executed in vehicle by an ego vehicle that is at least partially blocking a sensor view of the remote vehicle. In particular, the ego vehicle can receive sensor messages from a remote vehicle indicating that the remote vehicle's sensor view is at least partially occluded or obstructed. The remote vehicle may determine that the sensor view is occluded based on the raw sensor data and can transmit that determination to the ego vehicle. Alternatively, the ego vehicle may determine that the remote vehicle's sensor view is occluded if the remote vehicle transmits raw sensor data to the ego vehicle. Based on the raw sensor data, the ego vehicle can determine that it is contributing to or is responsible for the at least partially obstructed sensor view. Based on this determination, the ego vehicle can simulate changes in the remote vehicle's sensor view based on maneuvering the ego vehicle. The ego vehicle can select maneuvers to reduce or eliminate the occlusion and execute those maneuvers accordingly. The maneuvers can be evaluated to determine whether they are within the performance envelope of the blocking vehicle (e.g., is the blocking vehicle capable of performing the maneuvers) and whether they are within the confines of the rules under which the blocking vehicle is operating (e.g., permitted based on the blocking vehicle's AV stack).

Other embodiments can be executed over a network by a remote server. In these embodiments, sensor messages can be transmitted to the remote server, and the remote server or the remote vehicle may determine the occlusion. The remote server can identify one or more vehicles contributing to the obstructed sensor view based on the remote sensor vehicle's sensor messages, the location of connected vehicles, sensor messages from other vehicles, or any other data received at the remote server. Once the appropriate vehicles are identified, the remote server can simulate changes in the remote vehicle's sensor view based on maneuvering the vehicles. The remote server can select maneuvers to reduce or eliminate the occlusion and communicate with the relevant vehicles' vehicle systems to execute those maneuvers.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for detecting and mitigating sensor occlusion can be implemented in other types of vehicles including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium-ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium-ion batteries, lead acid batteries, nickel cadmium batteries, lithium-ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
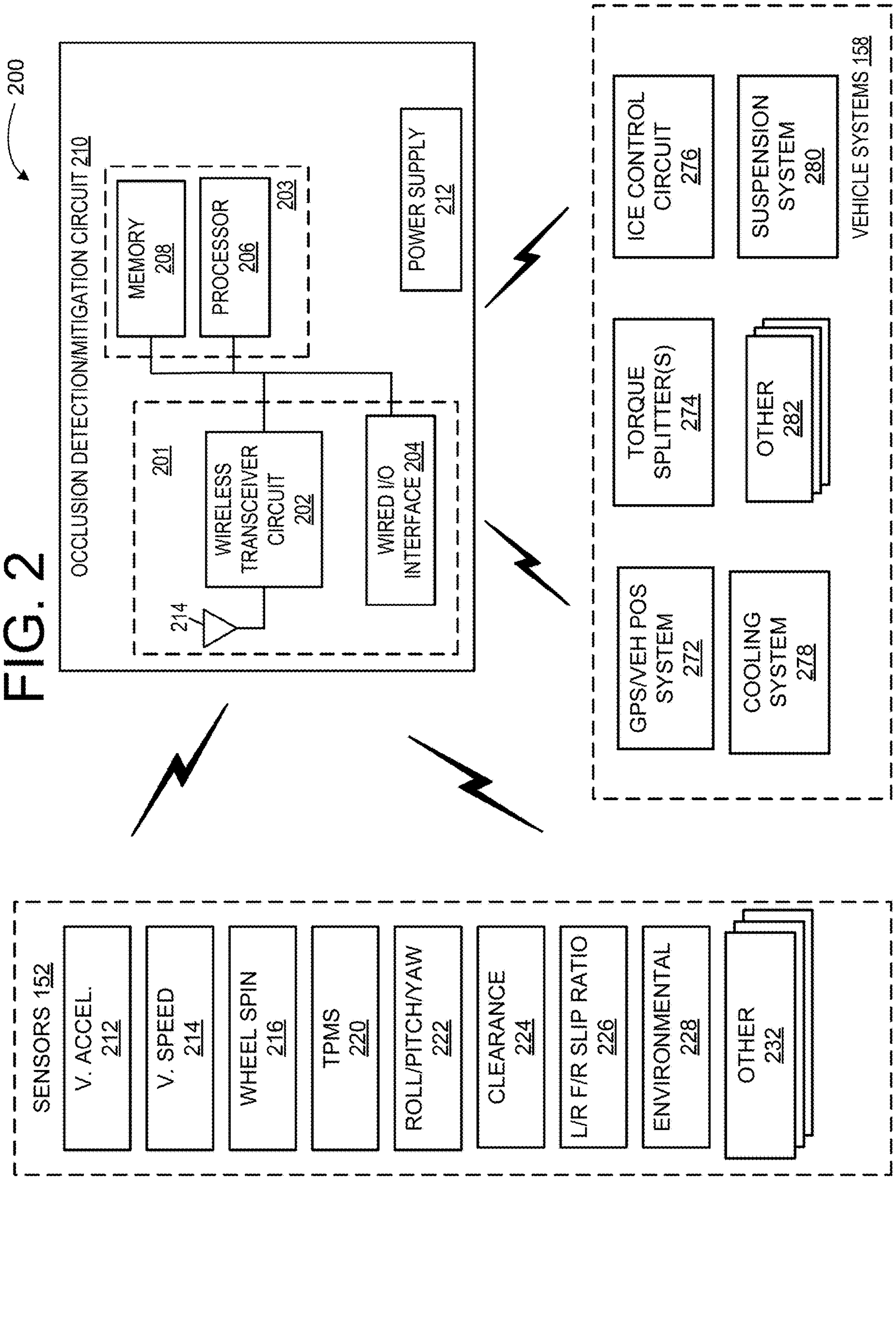
FIG. 2 illustrates an example architecture for detecting and mitigating sensor occlusion in accordance with one embodiment of the systems and methods described herein.

FIG. 2 illustrates an example architecture for detecting and mitigating sensor occlusion in accordance with one embodiment of the systems and methods described herein. In some embodiments, occlusion detection and mitigation system 200 can be implemented in-vehicle to execute while a driver is operating the vehicle. In other embodiments, occlusion detection and mitigation system 200 can operate over a cloud or other network. Referring now to FIG. 2, in this example, occlusion detection and mitigation system 200 includes an occlusion detection and mitigation circuit 210, a plurality of sensors 152 and a plurality of vehicle systems 158.

Sensors 152 and vehicle systems 158 can communicate with occlusion detection and mitigation circuit 210 via a wired or wireless communication interface. Although sensors 152 and vehicle systems 158 are depicted as communicating with occlusion detection and mitigation circuit 210, they can also communicate with each other as well as with other vehicle systems. In embodiments where occlusion detection and mitigation circuit 210 is implemented in-vehicle, occlusion detection and mitigation circuit 210 can be implemented as an ECU or as part of an ECU such as, for example electronic control unit 50. In other embodiments, occlusion detection and mitigation circuit 210 can be implemented independently of the ECU, such that sensors 152 and vehicle systems 158 can communicate to occlusion detection and mitigation circuit 210 over a network, server or cloud interface. In embodiments where occlusion detection and mitigation circuit 210 operates over a network, occlusion detection and mitigation circuit 210 can execute the architecture described below in FIG. 3B and communicate back to sensors 152 and vehicle systems 158.

Occlusion detection and mitigation circuit 210 in this example includes a communication circuit 201, a decision circuit 203 (including a processor 206 and memory 208 in this example) and a power supply 212. Components of occlusion detection and mitigation circuit 210 are illustrated as communicating with each other via a data bus, although other communication in interfaces can be included. Occlusion detection and mitigation circuit 210 can detect that a remote vehicle's sensor view is occluded. Decision circuit 203 can determine that the vehicle is responsible for the occlusion. Occlusion detection and mitigation circuit 210 can communicate with vehicle systems 158 to perform a maneuver to reduce the obstructed sensor view of the remote vehicle. Occlusion detection and mitigation circuit 210 can also communicate with sensors 152 to simulate how different maneuvers will affect the remote vehicle's sensor view. Decision circuit 203 can execute the architecture described below in FIG. 3A.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to occlusion detection and mitigation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make occlusion detection and mitigation circuit 210.

Communication circuit 201 can comprise either or both a wireless transceiver circuit 202 with an associated antenna 205 and a wired I/O interface 204 with an associated hardwired data port (not illustrated). Communication circuit 201 can provide for V2X and/or V2V communications capabilities, allowing occlusion detection and mitigation circuit 210 to communicate with edge devices, such as roadside unit/equipment (RSU/RSE), network cloud servers and cloud-based databases, and/or other vehicles via a network. For example, V2X communication capabilities allows occlusion detection and mitigation circuit 210 to communicate with edge/cloud devices, roadside infrastructure (e.g., such as roadside equipment/roadside unit, which may be a vehicle-to-infrastructure (V2I)-enabled streetlight or cameras, for example), etc. Local occlusion detection and mitigation circuit 210 may also communicate with other connected vehicles over vehicle-to-vehicle (V2V) communications.

As used herein, "connected vehicle" refers to a vehicle that is actively connected to edge devices, other vehicles, and/or a cloud server via a network through V2X, V2I, and/or V2V communications. An "unconnected vehicle" refers to a vehicle that is not actively connected. That is, for example, an unconnected vehicle may include communication circuitry capable of wireless communication (e.g., V2X, V2I, V2V, etc.), but for whatever reason is not actively connected to other vehicles and/or communication devices. For example, the capabilities may be disabled, unresponsive due to low signal quality, etc. Further, an unconnected vehicle, in some embodiments, may be incapable of such communication, for example, in a case where the vehicle does not have the hardware/software providing such capabilities installed therein.

As this example illustrates, communications with occlusion detection and mitigation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by occlusion detection and mitigation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 10 with which occlusion detection and mitigation system 200 is implemented. In the illustrated example, sensors 152 include vehicle acceleration sensors 212, vehicle speed sensors 214, wheelspin sensors 216 (e.g., one for each wheel), proximity sensors 218, image or video sensors 220 and environmental sensors 222 (e.g., to detect salinity or other environmental conditions). Additional sensors 224 can also be included as may be appropriate for a given implementation of occlusion detection and mitigation system 200.

Vehicle systems 158 can include any of a number of different vehicle components or subsystems used to control or monitor various aspects of the vehicle and its performance. In this example, the vehicle systems 158 include a GPS or other vehicle positioning system 272; engine control circuits 274 to control the operation of engine (e.g., Internal combustion engine 14); and other vehicle systems 276.

Communication circuit 201 can be used to transmit and receive information between occlusion detection and mitigation circuit 210 and sensors 152, and occlusion detection and mitigation circuit 210 and vehicle systems 158. Also, sensors 152 may communicate with vehicle systems 158 directly or indirectly (e.g., via communication circuit 201 or otherwise).

Figure 3A:
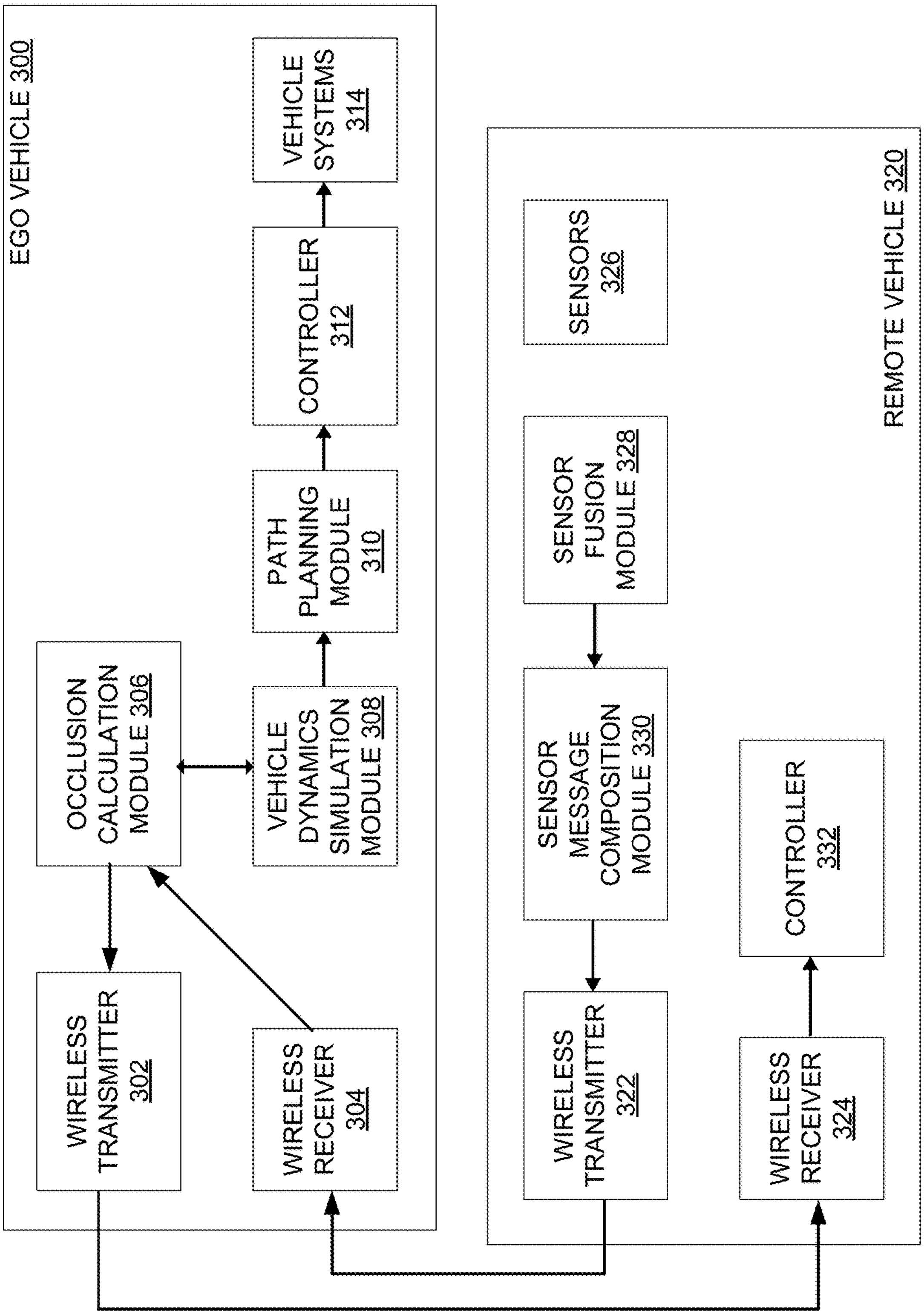
FIG. 3A illustrates an example system in-vehicle in accordance with various embodiments of the systems and methods described herein.

FIG. 3A illustrates an example architecture executed in-vehicle. The architecture of FIG. 3A can occur at an ego vehicle 300 to assist a remote vehicle 320 with an occluded sensor view. Remote vehicle 320 can generate sensor data at sensors 326 to generate an original sensor view. Sensors 326 can include any sensors (e.g., sensors 152) such as image/video sensors, GPS sensors, proximity sensors, environmental sensors, or any other sensors that can contribute to the operation of remote vehicle 320. Sensor data can be transmitted to a sensor fusion module 328. Sensor fusion module 328 can combine and process the sensor data to generate an original field of view for remote vehicle 320. This original field of view may include occlusions in a particular geographic area or location in the original field of view. These occlusions may be due to objects blocking one or more sensors of the remote vehicle 320. Sensor message composition module 330 can generate a sensor message including the original field of view to transmit to ego vehicle 300. Sensor messages can include information about detected objects including the class of object, position of object, speed of object, size of object, etc. Examples of sensor messages can include Collective Perception Messages and Sensor Data Sharing Messages. These sensor messages can inform ego vehicle 300 of remote vehicle 320's original field of view.

The sensor messages can be transmitted via a wireless transmitter 322 (e.g., as part of wireless transceiver circuit 202) to ego vehicle 300. Ego vehicle 300 can receive the sensor messages at wireless receiver 304 (e.g., as part of wireless transceiver circuit 202). Wireless receiver 304 can transmit the sensor messages to an occlusion calculation module 306 (e.g., at decision circuit 203) which can process the sensor messages to determine the location of any occlusions. Occlusions can be indicated based on geographic areas missing sensor data. Occlusions can also be determined if one or more sensors have a reduced range or distance. In some embodiments, occlusion calculation module 306 can receive remote vehicle 320's proposed trajectory. If the trajectory is incomplete, occlusion calculation module 306 can determine that there is an occlusion. In other embodiments, ego vehicle 300 may detect an object while remote vehicle 320 does not detect the object. Ego vehicle 300 can determine that there is an occlusion obstructing sensors from detecting the object. In some embodiments, occlusions may be detected by means of a ray-tracing algorithm. Using such an algorithm requires the knowledge of the range and field of view of the sensors on the remote vehicle (contained in the Sensor Message), as well as the size of the detected object (also contained in the Sensor Message).

Occlusion calculation module 306 can determine that ego vehicle 300 is contributing to the occlusion based on ego vehicle 300's location. Occlusion calculation module 306 can also simulate remote vehicle 320's sensor view without the presence of ego vehicle 300. If the simulated sensor view is different from the remote vehicle's occluded sensor view, then occlusion calculation module 306 can conclude that ego vehicle 300 is contributing to the sensor occlusion. Occlusion calculation module 306 can take into account any sensor data (e.g., from sensors 152) to determine that ego vehicle 300 is contributing to the sensor occlusion. In some embodiments, occlusion calculation module 306 can attribute a degree or level of occlusion to ego vehicle 300's current position. In some embodiments, this degree may be a percent reduction in the field of view, a physical range or distance of sensor occlusion, a severity of occlusion, or any other measurement. In some embodiments, occlusion calculation module 306 can determine the degree of occlusion based on a comparison between remote vehicle 320's actual field of view and the simulated field of view without the presence of ego vehicle 300. This degree or level of occlusion designation can be used to determine how effective remedies to the occlusion are for remote vehicle 320.

Occlusion calculation module 306 can transmit information on the occlusion to vehicle simulation dynamics module 308 (e.g., at decision circuit 203). Vehicle simulation dynamics module 308 can simulate potential maneuvers for ego vehicle 300 to reduce or remove the sensor occlusion. Vehicle simulation dynamics module 308 can generate a potential list of maneuvers for ego vehicle 300. In some embodiments potential maneuvers is a set of maneuvers that satisfies safety and feasibility requirements (can be generated by using the local dynamic map of the ego vehicle), and also minimizes use of energy. For each potential maneuver, vehicle simulation dynamics module 308 can generate a simulated sensor field of view for remote vehicle 320. The simulated sensor field of view can incorporate the remote vehicle's sensor field of view, ego vehicle 300's sensor data, and the level of occlusion determined from occlusion calculation module 306 to predict any changes to the remote vehicle's sensor field of view. This change can be quantified as a change the degree or level of occlusion as described above. In some embodiments, vehicle simulation dynamics module 308 can select maneuvers that exceed a threshold change in the level or degree of occlusion. In some embodiments, the selected maneuver may be the maneuver with the least amount of movement or deviation from trajectory for ego vehicle 300. In some embodiments the selected maneuver is a potential maneuver that satisfies specific requirements given by the system designer; for example, requirements may be to reduce the obstruction of the remote vehicle by at least some minimum percentage, and use some maximum amount of energy. If the system fails to find such a maneuver, no action is performed by the ego vehicle.

Once one or more maneuvers are selected, vehicle simulation dynamics module 308 can transmit information on the maneuvers to path planning module 310 at decision circuit 203. Path planning module 310 can update ego vehicle 300's trajectory and communicate with controller 312 and vehicle systems 314. Here, controller 312 can correspond to any vehicle controller such as electronic control unit 50. Vehicle systems 314 can refer to any vehicle systems needed to execute the updated trajectory (e.g., vehicle systems 158). While controller 312 and vehicle systems 314 execute the maneuvers, information on the occlusion and selected maneuvers can be transmitted back to remote vehicle 320 and received at wireless receiver 324. Wireless receiver 324 can transmit the information to controller 332. Controller 332 of the remote vehicle can use this information to update the sensor field of view after the maneuver is complete, execute the current trajectory, or operate remote vehicle 320 in response to resolving the sensor occlusion.

Figure 3B:
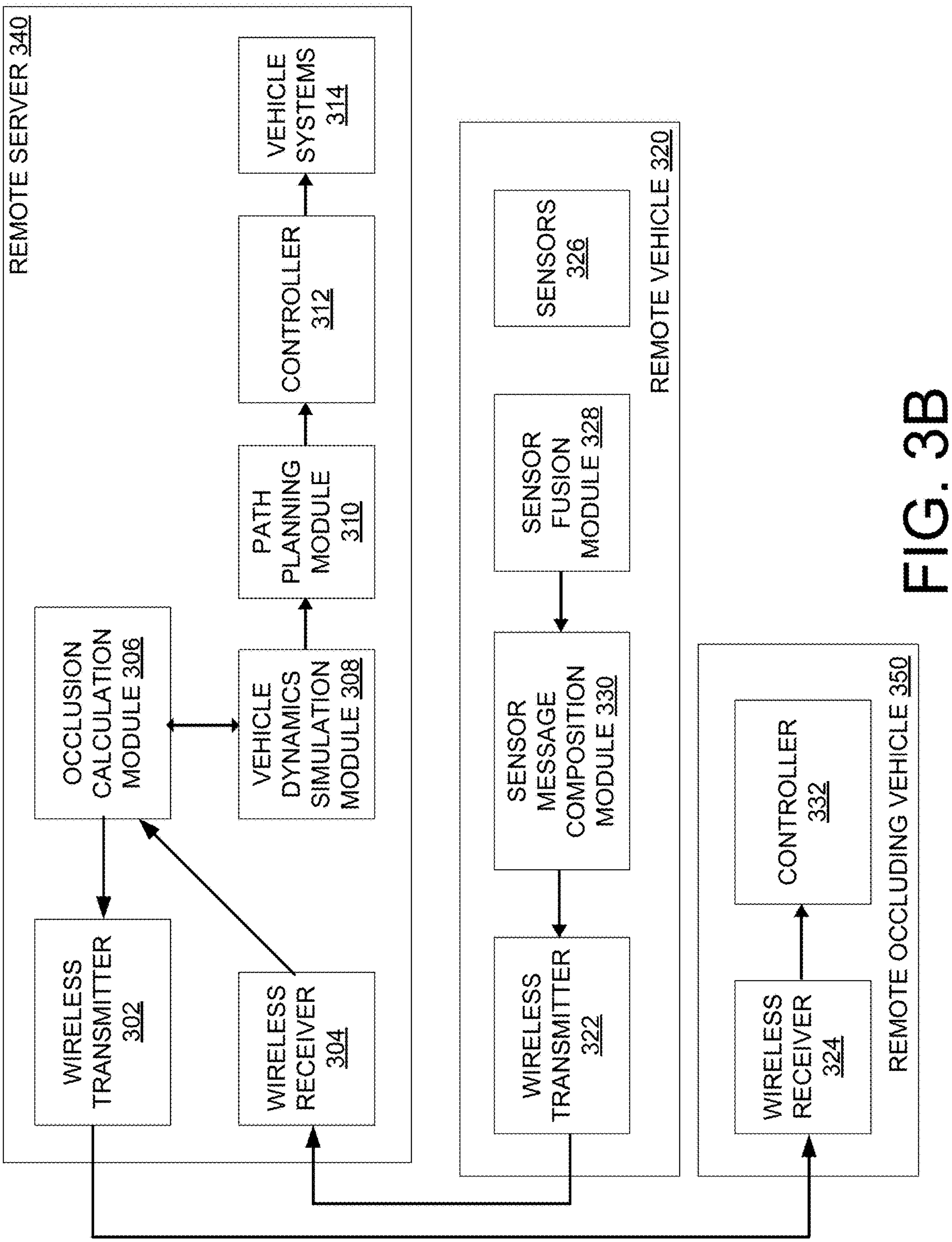
FIG. 3B illustrates an example system implemented remotely in accordance with various embodiments of the systems and methods described herein.

FIG. 3B illustrates an alternative system similar to FIG. 3A incorporating a remote server. In FIG. 3B, wireless transmitter 302, wireless transmitter 304, occlusion calculation module 306, vehicle dynamics simulation module 308, and path planning module 310 are located at a remote server 340. As opposed to FIG. 3A, sensor message composition module 330 can generate a sensor message including the original field of view to transmit to remote server 340. Remote server 340 can execute the functions described above in FIG. 3A to determine maneuvers for a remote occluding vehicle 350. Remote server 340 can use vehicle simulation dynamics module 308 to transmit information on the maneuvers to path planning module 310. Path planning module 310 can update remote occluding vehicle 350's trajectory and communicate with controller 332 and vehicle systems 334 at remote occluding vehicle 350. Remote server 340 can transmit commands to be received at wireless receiver 324, which in turn can communicate with controller 332 and vehicle systems 334.

Figure 4A:
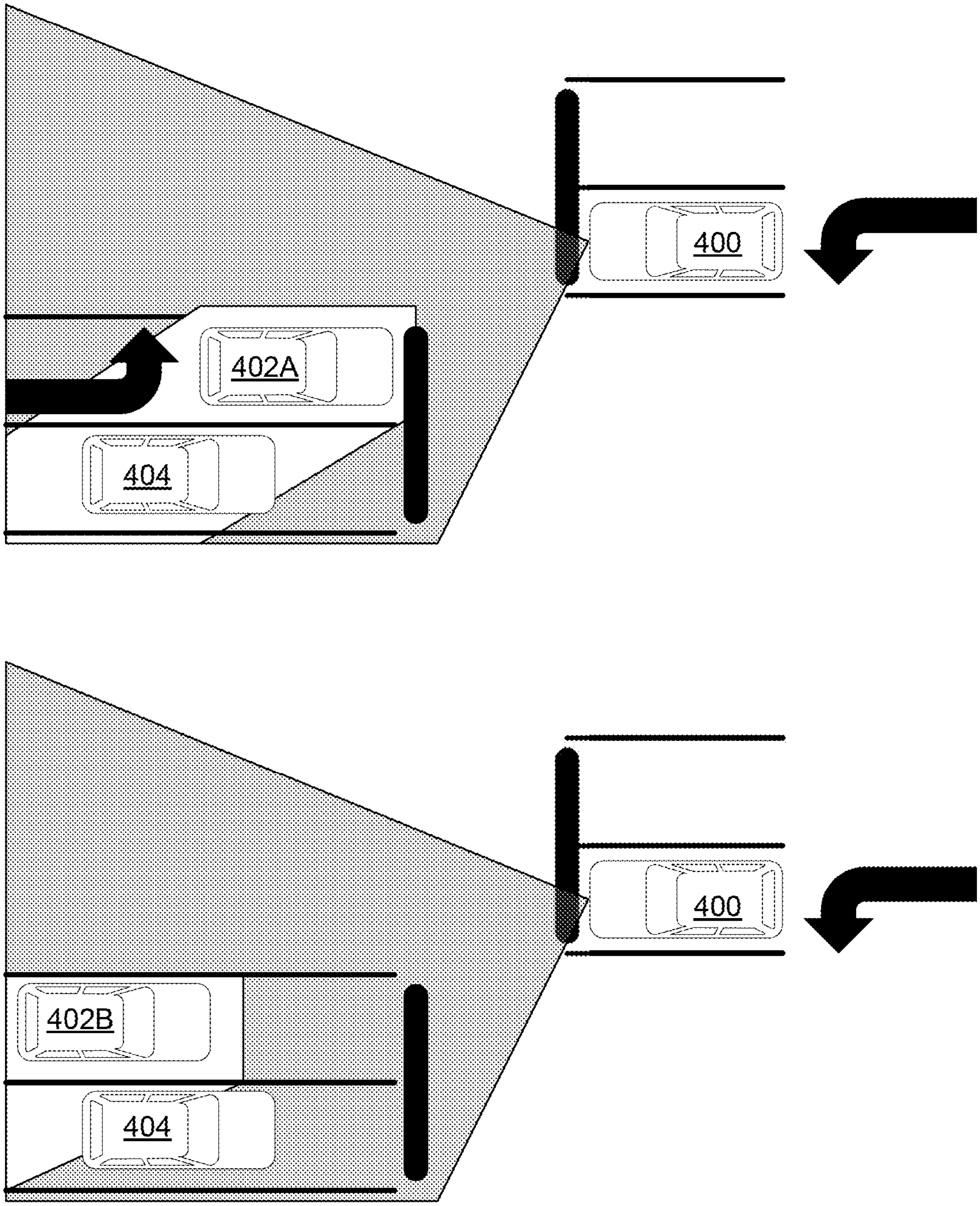
FIG. 4A illustrates an example scenario incorporating the systems and methods described herein.

FIG. 4A illustrates an example scenario incorporating the systems in FIG. 3A or 3B. Remote vehicle 400 may approach an intersection with an unprotected left turn. Its trajectory may be to turn left at this intersection. Ego vehicle 402A may be approaching on the other side of the road. Remote vehicle 400 can transmit a sensor message to ego vehicle 402A with the sensor field of view. The sensor message can include information such as the sensor range and field of view, detected objects, and/or confidence of detection for particular regions in the sensor coverage area. As described above, ego vehicle 402A may determine that its current location occludes remote vehicle 400's sensor view, in particular because remote vehicle 400 may not be able to fully detect vehicle 404. As illustrated in FIG. 4A, ego vehicle 402A's location blocks remote vehicle 400's sensors from reaching vehicle 404. Ego vehicle 402A can determine an available range of movement for ego vehicle 402A based on ego vehicle 402A's sensor data. In the example of FIG. 4A, ego vehicle 402A's lane detection systems can be used to determine where in the left turn lane ego vehicle 402A can traverse without breaking lanes or hitting other vehicles. Based on the information about the range of movement and the sensor message from remote vehicle 400, ego vehicle 402A can determine where to move in the range of movement to minimize its occlusion of remote vehicle 400's sensors. As described above, ego vehicle 402A can simulate its motion and the changes to remote vehicle 400's sensor views to determine which maneuver to execute. In some embodiments, ego vehicle 402A can simulate additional vehicles in the same or adjacent lane to determine additional or future sensor occlusions. The simulation of additional vehicles can assist ego vehicle 402A in determining how occluded the adjacent lane would be for remote vehicle 400 and how close a vehicle such as vehicle 404 can approach before remote vehicle 400 is able to detect the vehicle while handicapped by the sensor occlusion. In the example of FIG. 4A, the selected maneuver can result in the ego vehicle being moved to position 402B. As illustrated in FIG. 4A, ego vehicle 402B may still partially block vehicle 404, but remote vehicle 400 is now able to detect vehicle 404.

Figure 4B:
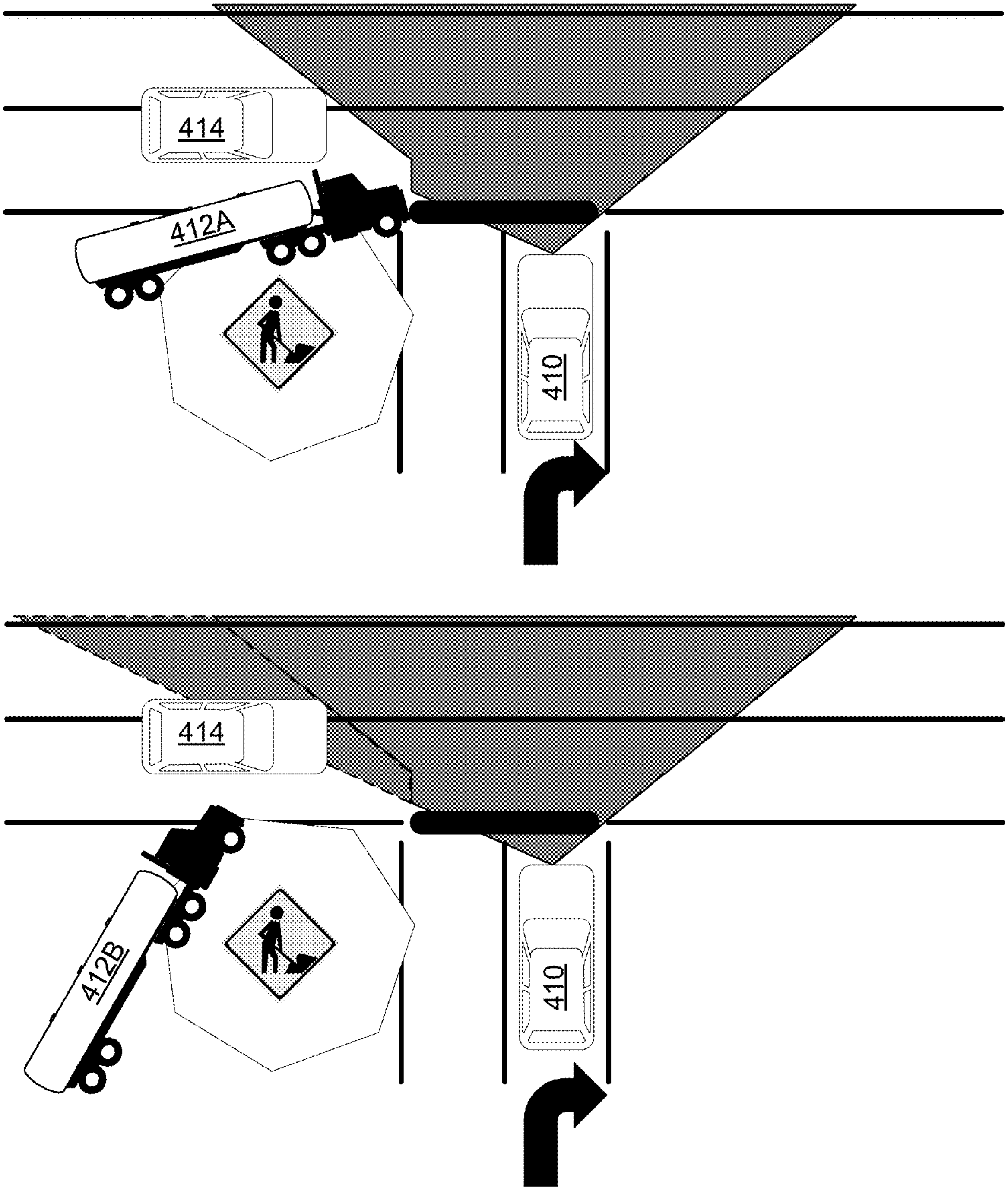
FIG. 4B illustrates another example scenario incorporating the systems and methods described herein.

FIG. 4B illustrates another potential scenario incorporating the systems of FIG. 3A or 3B as described above. In FIG.

4B, remote vehicle 410 can approach an intersection where there is a service vehicle 412A around a construction zone. Service vehicle 412A may be blocking the view of the main street, and remote vehicle 410 would not be able to detect vehicle 414 due to the obstruction. Remote vehicle 410 can transmit a sensor message that includes detected objects and sensor data to service vehicle 412A or service infrastructure for the construction site. Once the construction site or service vehicle 412A receives the sensor message, it can simulate moving service vehicle 412A. These simulations can be used to determine that service vehicle 412A can be moved to position 412B at the side of the construction zone to improve the view of remote vehicle 410. In some embodiments, a ray tracing approach can be used to predict the field of view and occlusions for remote vehicle 410 after the motion is accomplished. In embodiments where the infrastructure determines the maneuvers, the infrastructure can issue prescriptive maneuver messages to move the service vehicle to position 412B. These maneuver messages can comprise trajectories for the service vehicle to execute to accomplish the maneuvers.

Figure 5:
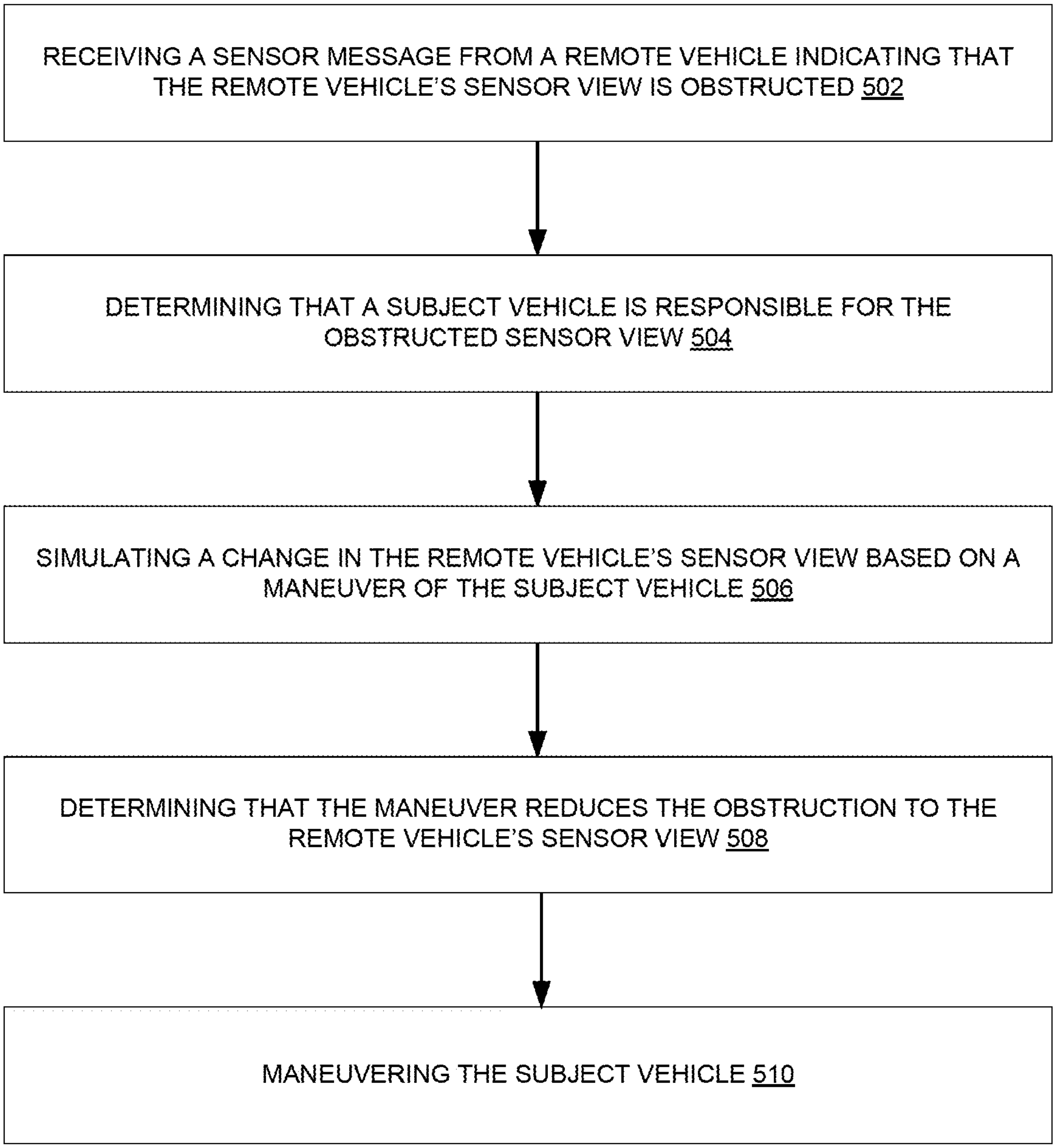
FIG. 5 illustrates an example method in accordance with one embodiment.

FIG. 5 illustrates an example method in accordance with the systems and examples described above in FIGS. 3A, 3B, 4A, and 4B. As described above with FIGS. 3A and 3B, the method of FIG. 5 can be executed in vehicle (e.g., at FIG. 3A) or with a remote server in communication with occluding vehicles (e.g., at FIG. 3B.) At block 502, the system can receive a sensor message from a remote vehicle indicating that the remote vehicle's sensor view is obstructed. At block 504, the system can determine that a subject vehicle is responsible for the obstructed sensor view. In some embodiments, the subject vehicle may be partially obstructing the sensor view or may otherwise be partially responsible for the obstructed sensor view. As described above, sensor messages can include information about detected objects including the class of object, position of object, speed of object, size of object, etc. Occlusions can be indicated based on geographic areas missing associated sensor areas or reduced range or distance a sensor can reach. In some embodiments, the system can receive the remote vehicle's proposed trajectory. If the trajectory is incomplete, the system can determine that there is an occlusion. The system can determine that the subject vehicle is contributing to the occlusion based on location, sensor data, or simulations in sensor view removing the subject vehicle. If the simulated sensor view is different from the remote vehicle's sensor view, the system can conclude that the subject vehicle is contributing to the sensor occlusion.

At block 506, the system can simulate a change in the remote vehicle's sensor view based on a maneuver of the subject vehicle. At block 508, the system can determine that the maneuver reduces or eliminates the obstruction to the remote vehicle's sensor view. As described above, the system can simulate potential maneuvers for the subject vehicle to reduce or remove the sensor occlusion by generating a potential list of maneuvers. For each potential maneuver, the system can generate a simulated sensor field of view for the remote vehicle. The simulated sensor field of view can incorporate the remote vehicle's sensor field of view, subject vehicle's sensor data, and the level of occlusion to predict any changes to the remote vehicle's sensor field of view. In some embodiments, the selected maneuvers can exceed a threshold change in the level or degree of occlusion. In some embodiments, the selected maneuver may be the maneuver with the least amount of movement or deviation from trajectory.

At block 510, the system can maneuver the subject vehicle. As described above, the system can update the subject vehicle's trajectory and communicate with the subject vehicle's controller and vehicle systems. Information on the occlusion and selected maneuvers can be transmitted back to the remote vehicle to update the sensor field of view after the maneuver is complete, execute the current trajectory, or operate the remote vehicle in response to resolving the sensor occlusion. In some embodiments, the system can maneuver a plurality of vehicles to reduce the sensor occlusion. The system may maneuver additional vehicles to exceed the threshold reduction in sensor occlusion.

Figure 6:
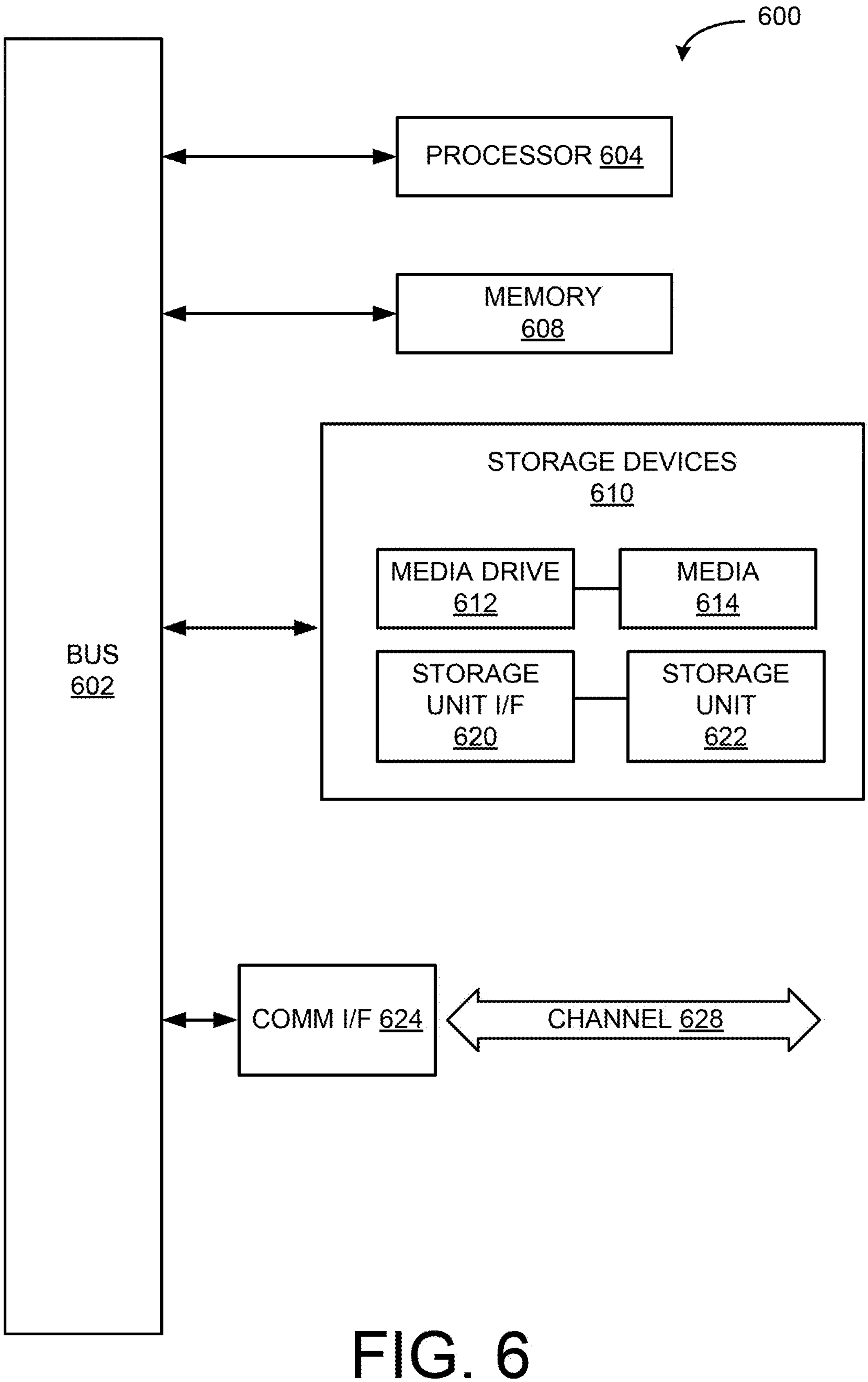
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

determining, based at least in part on a determination that a trajectory generated by a first vehicle is incomplete, that an occlusion exists in the first vehicle's sensor view;

determining that the indicated occlusion is caused by a second vehicle at least partially obstructing the first vehicle's sensor view;

determining a maneuver for the second vehicle that reduces or eliminates the second vehicle's occlusion of the first vehicle's sensor view; and causing the second vehicle to perform the determined maneuver.

2. The method of claim 1, wherein determining the maneuver for the second vehicle comprises simulating a change in the first vehicle's sensor view based on the maneuver.

3. The method of claim 1, wherein a plurality of vehicles are responsible for the obstructed sensor view, the method further comprising maneuvering one or more of the plurality of vehicles to reduce or eliminate the occlusion.

4. The method of claim 1, further comprising determining that a second maneuver for the first vehicle would reduce the occlusion and maneuvering the first vehicle accordingly.

5. The method of claim 1, wherein determining the maneuver for the second vehicle comprises determining whether the maneuver exceeds a threshold reduction to the occlusion.

6. The method of claim 5, wherein the threshold reduction is based on the first vehicle's ability to sense an object in the second vehicle's sensor view.

7. The method of claim 5, wherein the threshold reduction is based on a distance to which the first vehicle can sense objects.

8. The method of claim 5, wherein the threshold reduction is based on a percentage of the sensor view that is occluded.

9. The method of claim 1, wherein determining the maneuver for the second vehicle comprises determining whether the maneuver is performable by the second vehicle.

10. The method of claim 9, wherein determining whether the maneuver is performable by the second vehicle comprises determining at least one of (i) whether the maneuver is within a performance envelope for the second vehicle; and (ii) whether the maneuver would violate a rule governing operation of the second vehicle.

11. A vehicle, comprising:

One or more processors; and a memory coupled to one or more processors to store instructions, which when executed by the one or more processors, cause at least one of the one or more processors to:

determine, based at least in part on a determination that a trajectory generated by a remote vehicle is incomplete, that an occlusion exists in the remote vehicle's sensor view;

determine that the indicated occlusion is caused by a second vehicle at least partially obstructing the remote vehicle's sensor view;

determine a maneuver for the second vehicle that reduces or eliminates the second vehicle's occlusion of the remote vehicle's sensor view; and cause the second vehicle to perform the determined maneuver.

12. The vehicle of claim 11, wherein determining the maneuver for the second vehicle comprises simulating a change in the remote vehicle's sensor view based on the maneuver.

13. The vehicle of claim 11, wherein determining that the maneuver reduces the occlusion comprises determining that the maneuver exceeds a threshold reduction to the occlusion.

14. The vehicle of claim 13, wherein the threshold reduction is based on the remote vehicle's ability to sense an object in the second vehicle's sensor view.

15. The vehicle of claim 13, wherein the threshold reduction is based on a distance the remote vehicle can sense objects.

16. The vehicle of claim 13, wherein the threshold reduction is based on a percentage of the sensor view that is occluded.

17. A non-transitory machine-readable medium having instructions stored therein, which when executed by one or more processors, cause the one or more processors to:

determine, based at least in part on a determination that a trajectory generated by a first vehicle is incomplete, that an occlusion exists in the first vehicle's sensor view;

determine that the indicated occlusion is caused by a plurality of other vehicles at least partially obstructing the first vehicle's sensor view;

simulate a change in the first vehicle's sensor view based on one or more maneuvers of the plurality of other vehicles;

determine that the one or more maneuvers reduce or eliminate the occlusion to the first vehicle's sensor view; and cause one or more of the plurality of other vehicles to perform the one or more maneuvers.

18. The non-transitory machine-readable medium of claim 17, wherein determining that the one or more maneuvers reduce the occlusion to the first vehicle's sensor view comprises determining that each of the one or more maneuvers exceeds a threshold reduction to the occlusion.

19. The non-transitory machine-readable medium of claim 17, wherein a threshold reduction of the occlusion is based on the first vehicle's ability to sense an object in one vehicle's of the plurality of other vehicles sensor view.

20. The non-transitory machine-readable medium of claim 19, wherein the threshold reduction is based on a percentage of the sensor view that is occluded.

* * * * *